United States Patent
Wada et al.

(10) Patent No.: US 7,554,780 B2
(45) Date of Patent: Jun. 30, 2009

(54) INVERTER SYSTEM, AC ROTATING MACHINE AND ELECTRIC POWER CONVERTER

(75) Inventors: Kotaro Wada, Tokyo (JP); Hirotaka Muto, Tokyo (JP); Kosei Tsuji, Tokyo (JP); Osamu Yashiro, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 281 days.

(21) Appl. No.: 11/264,386

(22) Filed: Nov. 2, 2005

(65) Prior Publication Data

US 2006/0113951 A1 Jun. 1, 2006

(30) Foreign Application Priority Data

Nov. 12, 2004 (JP) ............................. 2004-329184
Jul. 29, 2005 (JP) ............................. 2005-221037

(51) Int. Cl.
*H02H 7/09* (2006.01)
(52) U.S. Cl. ..................... 361/33; 318/767; 318/729; 318/799
(58) Field of Classification Search ................ 361/33, 318/767, 318/729, 799
See application file for complete search history.

(56) References Cited

U.S. PATENT DOCUMENTS 3,621,118 A * 11/1971 Bunish et al. ............... 174/115
5,440,229 A * 8/1995 Schieman ................ 324/76.44
5,905,354 A * 5/1999 Futsuhara et al. ........... 318/700
6,331,760 B1 * 12/2001 McLane, Jr. ................ 318/767
2005/0259370 A1 * 11/2005 Kubo ........................... 361/42

FOREIGN PATENT DOCUMENTS

| CN | 1700577 A | 11/2005 |
|----|-----------|---------|
| JP | 8-98536 A | 4/1996 |
| JP | 09-294381 | 11/1997 |
| JP | 10-135681 | 5/1998 |

* cited by examiner

*Primary Examiner*—Lincoln Donovan
*Assistant Examiner*—Erick Glass
(74) *Attorney, Agent, or Firm*—Leydig, Voit & Mayer, Ltd.

(57) ABSTRACT

In an inverter system including of an electric-power converter and an ac rotating machine, over-voltage generated in the ac rotating machine is controlled by a low-cost system configuration. The system includes: an electric-power converter; a three-phase ac rotating machine; and a four-core non-coaxial cable, having a ground line and three-phase electric-power supplying lines, connecting the electric-power converter to the three-phase ac rotating machine. One or two capacitors are connected between the ground line and one or two of the electric-power supplying lines, at electric-power supplying terminals on the rotating machine, so that respective capacitances between the three-phase electric-power supplying lines and the ground line are approximately equal to each other.

10 Claims, 5 Drawing Sheets

INVERTER SYSTEM, AC ROTATING MACHINE AND ELECTRIC POWER CONVERTER

BACKGROUND OF THE INVENTION

1. Field of the Invention

The present invention relates to inverter systems, which include a PWM-type (pulse-width-modulation type) electric power converter and an ac rotating machine connected to the electric power converter through a three-phase cable, for reducing surge voltage generated in the ac rotating machine when the systems operate. Moreover, the present invention relates to ac rotating machines and electric power converters that can reduce the surge voltage.

2. Description of the Related Art

In a PWM-type electric power converter, output voltage is adjusted by on-off controlling switching devices of an inverter with a high-frequency carrier signal. In a three-phase cable connecting this electric power converter with an ac rotating machine (motor and dynamo), a resistive component R and an inductive component L exist corresponding to the cable length, and capacitance C also exists between lines of the cable, and between each of the lines and ground. As a result, when rapidly varying voltage is outputted from the electric power converter to the three-phase cable, by resonance due to R, L and C the over-voltage is applied to terminals on the ac rotating machine. Therefore, in order to reduce the over-voltage at the terminals of the ac rotating machine, an over-voltage reduction means has conventionally been provided together with the terminals (for example, refer to Patent document 1).

According to Patent document 1, in an input/output non-insulating electric-power converter having a rectifier for converting ac to dc and an inverter for converting the dc to ac, an over-voltage reduction means is disclosed, in which over-voltage at an electric-power-supply terminal of the rotating machine is reduced by a method of connecting the neutral points of capacitors in an ac output filter including the capacitors and reactors with a dc circuit on the electric-power converter.

Moreover, in a driver having an electric power converter and an ac rotating machine, in order to prevent common-mode noise, which is generated in the electric power converter, from affecting external equipment, a coaxial-cable core line has been conventionally used for connecting the output terminal of the electric power converter with the input terminal of the ac rotating machine, and each of the outer conductor ends of the coaxial cable has been connected to the frame (ground terminal) of the electric power converter and to the frame (ground terminal) of the ac rotating machine (for example, refer to Patent document 2). The purpose of the driver as described above is to prevent the common-mode noise, but not to prevent the surge voltage inside the rotating machine; however, using three single-core coaxial cables or a three-core coaxial cable can resultantly reduce the over voltage at the ac rotating-machine.

[Patent document 1] Japanese Laid-Open Patent Publication 294,381/1997

[Patent document 2] Japanese Laid-Open Patent Publication 135,681/1998

SUMMARY OF THE INVENTION

However, in the over-voltage reduction method disclosed in Patent document 1, because the same ac output filters are connected with all three phases, these filters cost relatively expensive.

Meanwhile, in the driver disclosed in Patent document 2, by using three single-core coaxial cables or a three-core cable, over-voltage at the AC rotating machine is resultantly reduced; however, because coaxial cable, particularly multi-core coaxial cable, is extremely expensive comparing to vinyl cabtire cable, a problem has therefore occurred in an inverter system of especially low-capacity-class, in which the multi-core cable occasionally costs more than the inverter and the rotating machine itself, depending on the cable length.

An objective of the present invention, which is made to solve such a problem as described above, is to provide an inverter system that is composed of an electric power converter and an ac rotating machine, and that can reduce, with a low-cost system configuration, overvoltage in the ac rotating machine, by the switching operation of the inverter. Moreover, another objective is to provide an ac rotating machine and an electric power converter that can appropriately control the above described over voltage.

An inverter system according to a first aspect of the present invention includes: an electric power converter; a three-phase ac rotating machine; a non-coaxial cable, having, not fewer than four cores, a ground line and three-phase electric-power supplying lines, for connecting the electric power converter with the three-phase ac rotating machine; and one or two capacitors connected between one or two of three-phase electric-power supplying terminals, respectively, of the rotating machine, and a ground terminal of the rotating machine, so that the respective capacitances between the three-phase electric-power supplying lines and the ground line becomes approximately equal to each other.

An inverter system according to a second aspect of the present invention includes: an electric power converter; a three-phase ac rotating machine; a non-coaxial cable, having, not fewer than four cores, a ground line and three-phase electric-power supplying lines, for connecting the electric power converter with the three-phase ac rotating machine; and one or two capacitors connected between one or two of three-phase output terminals, respectively, of the electric power converter, and a ground terminal of the electric power converter, so that the respective capacitances between the three-phase electric-power supplying lines and the ground line become approximately equal to each other.

An inverter system according to a third aspect of the present invention includes: an electric power converter; a three-phase ac rotating machine; a non-coaxial cable, having, not fewer than four cores, a ground line and three-phase electric-power supplying lines, for connecting the electric power converter with the three-phase ac rotating machine; and one or two capacitors connected between the ground line and one or two of the three-phase electric power supplying lines, respectively, so that the respective capacitances between the three-phase electric-power supplying lines and the ground line become approximately equal to each other.

An inverter system according to a fourth aspect of the present invention includes: an electric power converter; a three-phase ac rotating machine; and three same-length non-coaxial cables, each having, as not fewer than four cores, a ground line and three-phase electric-power supplying lines, for connecting the electric power converter with the three-phase ac rotating machine, the three same-length non-coaxial cables being twisted so that the respective capacitances between the three-phase electric-power supplying lines and the ground line become approximately equal to each other.

An ac rotating machine according to a fifth aspect of the present invention includes a variable capacitor provided between at least one of three-phase electric-power supplying terminals and a ground terminal of the ac rotating machine.

An electric-power converter according to a sixth aspect of the present invention includes a variable capacitor provided between at least one of three-phase terminals and a ground terminal of the electric power converter.

According to the present invention, by setting the capacitance between the power supplying line for each phase and the ground line to be equal to each other, the unbalance of the over-voltage among the three phases can be eliminated; consequently, the maximum over-voltage can be reduced in the entire system.

Moreover, according to the present invention, because a variable capacitor is provided at one of the power supplying terminals of the ac rotating machine or one of the output terminals of the electric power converter, over-voltage can be appropriately reduced.

DESCRIPTION OF THE PREFERRED EMBODIMENTS

Embodiment 1

FIG. 1(a) and FIG. 1(b) are circuit-configuration views illustrating an inverter system according to Embodiment 1 of the present invention, and an inverter system in which over-voltage reduction measures are not taken, respectively.

Figure 2:
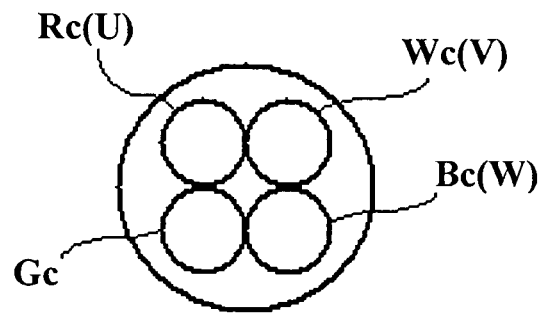
FIG. 2 is a cross-sectional configuration view illustrating a four-core cabtire cable according to Embodiment 1 of the present invention.
Figure 3:
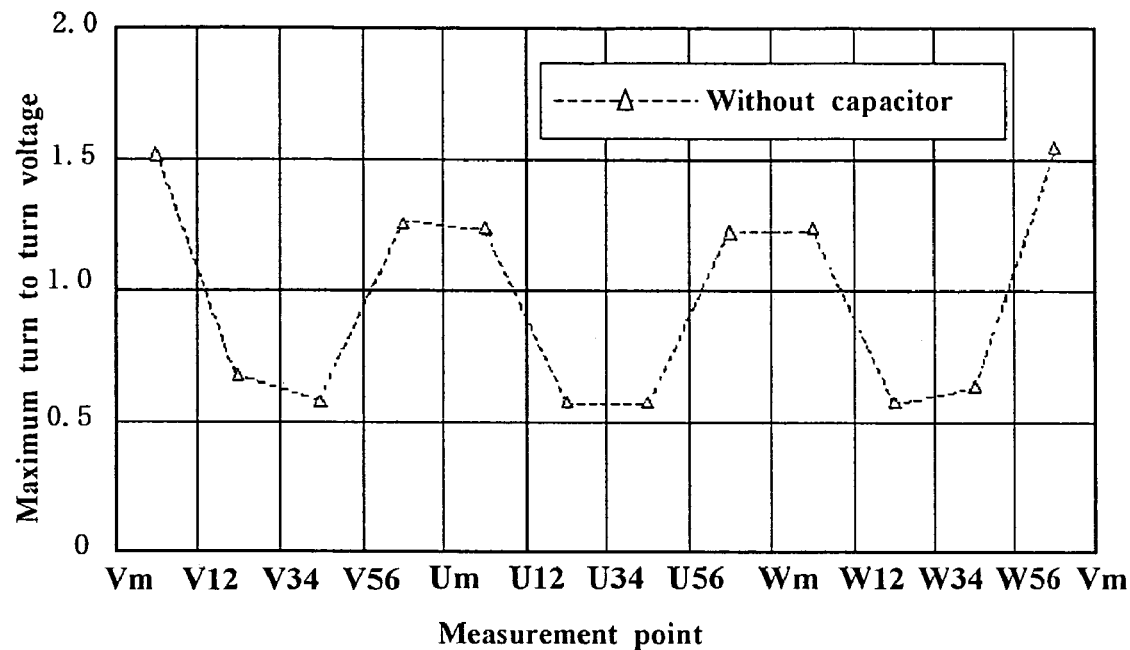
FIG. 3 is a graph representing a measurement result of the maximum turn to turn voltage in each coil of the inverter system in which over-voltage reduction measure is not taken.
Figure 4:
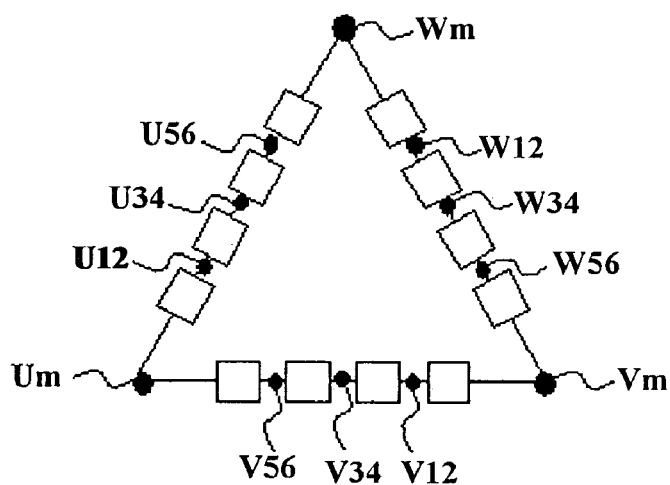
FIG. 4 is a view illustrating line connection in a rotating machine according to Embodiment 1 of the present invention.

In order to explain the merit of the inverter system of the present invention, by using the inverter system represented in FIG. 1(b), over-voltage generation in an ac rotating machine, in accordance with switching operations of the inverter, has been analyzed. In the configuration of FIG. 1(b), an electric power converter (an inverter) 1 and an ac rotating machine (a motor) 3 are connected through a three-phase electric-power supplying cable 2. The three-phase power supplying cable 2 has a cross-sectional shape as illustrated in FIG. 2, and is a four-core non-coaxial cable in which a ground line Gc, and three-phase electric-power supplying lines Rc, Wc, and Bc are included in the same cable. For example, the cable is configured using a 100 m four-core cabtire cable in which the core-line cross-sectional area is 2 mm$^2$. A measurement result of the maximum turn to turn voltage in each coil of the motor, when the inverter having such a configuration is operated, is represented in FIG. 3. A rotating machine used for the measurement in FIG. 3 has a delta connection as illustrated in FIG. 4, and each phase has four coils. Moreover, the measurement in FIG. 3 were carried out to measure the peak voltage between neighboring terminals (between the start and the end of each coil winding) among terminals (U-phase: Um, U12, U34, H56; V-phase: Vm, V12, V34, V56; W-phase: Wm, W12, W34, W56) represented in FIG. 4.

As found in FIG. 3, the maximum turn to turn voltage across each coil does not become equivalent among the four coils for each phase, but the maximum turn to turn voltage across the coil in which the motor terminals are the winding start or the winding end thereof (for example, Um-U12, or U56-Wm; hereinafter referred to as a first coil) is extremely large comparing to those in which neither the winding start nor the winding end thereof agrees with the motor terminals (for example, U12-U34, or U34-U56). This is a phenomenon occurring in the inverter system due to the following fact that the output voltage of the inverter comes into a rectangular having a sharp rising edge, therefore a large amount of high-frequency components are included in the output voltage; consequently, the rotating machine behaves as a capacitor with respect to the high-frequency components.

As also found in FIG. 3, in the circuit configuration of FIG. 4, the maximum values of the V-phase first-coil turn to turn voltages Vm-V12 and Vm-W56 are 20% or more higher comparing to the maximum values of the U-phase first-coil turn to turn voltages Um-U12 and Um-V56, and the W-phase first-coil turn to turn voltages Wm-W12 and Wm-U56. This phenomenon in which the V-phase first-coil turn to turn voltages become higher comparing to the other-phase first-coil turn to turn voltages is considered to depend on the structure of the power supplying cable 2. That is, because the cross-sectional structure of the four-core cabtire cable used as the power supplying cable 2 in the measurement in FIG. 3 is as illustrated in FIG. 2, the result can be considered to be caused by the capacitance between Wc (V-phase)-Gc being lower comparing to that between Rc (U-phase)-Gc, and Bc (W-phase)-Gc. The measurement result of the capacitances, between Rc-Gc, Bc-Gc, and Wc-Gc, per unit length of, for example, the four-core vinyl-cabtire cable (the core-line cross-sectional area of 2 mm² configured as illustrated in FIG. 1(b), are represented in table 1.

TABLE 1

|  | Capacitance (pF/m) |
| --- | --- |
| Between Rc-Gc | 76 |
| Between Bc-Gc |  |
| Between Wc-Gc | 13 |

As represented in table 1, line-to-ground capacitance of one of the three phases is obviously found to be lower comparing to that of the other phases. Therefore, it is considered that, caused by such difference in the capacitance, the turn to turn voltage of the first coil provided on any specified phase becomes higher comparing to that provided on the other phases.

If asymmetry of the three-phase line-to-ground capacitance in the power supplying cable can be eliminated so as to make the capacitance between each phase of the power supplying cables and ground equivalent, thereby a phenomenon in which the turn to turn voltage of the first coil provided on any specified phase becomes higher than that of other 2 phases can be prevented, the unbalance of the over voltage among the three phases can be eliminated, and excessive surge voltage generating only in any specified phase out of the three phases can also be prevented. As a result, the maximum over voltage can be reduced in the entire system.

Hereinafter, the inverter system represented in FIG. 1(a) according to Embodiment 1 of the present invention is explained. In FIG. 1, the three-phase output terminals Ui, Vi, and Wi of the voltage-type PWM inverter 1 that is a PWM-type electric power converter are connected to the phase terminals Um, Vm, and Wm of the ac rotating machine (motor or dynamo) 3, respectively, through the relatively long four-core cabtire cable 2 including the ground line Gc and the three-phase electric-power supplying lines Rc, Wc, and Bc.

The four-core cabtire cable 2 has a cross-sectional structure as illustrated in FIG. 2, in which, among the lines Rc, Wc, Bc, and Gc of the four-core cabtire cable 2, Rc is connected to Um that is the U-phase terminal of the rotating machine 3 and Ui that is the U-phase terminal of the inverter 1, Wc is connected to Vm that is the V-phase terminal of the rotating machine 3 and Vi that is the V-phase terminal of the inverter 1, Bc is connected to Wm that is the W-phase terminal of the rotating machine 3 and Wi that is the W-phase terminal of the inverter 1, and Gc is connected to Gm that is the ground terminal of the rotating machine 3 and Gi that is the ground terminal of the inverter 1.

Moreover, a capacitor 4 is connected between the V-phase electric-power supplying terminal Vm and the ground terminal Gm of the ac rotating machine 3.

In the four-core vinyl-cabtire cable 2 configured as illustrated in FIG. 1(b), the difference between the capacitances between Rc-Gc and between Bc-Gc, per meter of the cable, and that between Wc-Gc per meter, becomes approximately 60 pF That is, given that the cable length between the inverter 1 and the rotating machine 3 is L, the capacitance between Wc-Gc becomes L×60 pF lower comparing to that between Rc-Gc and between Bc-Gc, for example, when the cable length is 100 m, the capacitance between Wc-Gc becomes 6000 pF lower.

Thereby, in the inverter system illustrated in FIG. 1(a), the value of the capacitor 4 connected between the electric-power supplying terminal Wm and the ground terminal Gm is set at 6000 pF that has obtained based on the difference in the capacitance.

Figure 5:
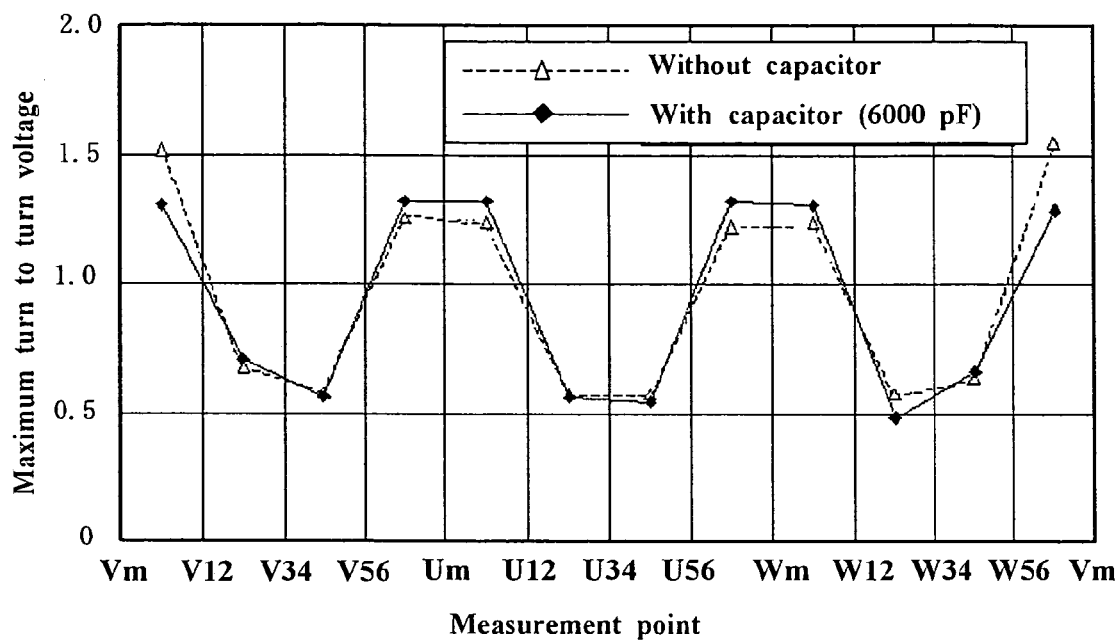
FIG. 5 is a graph representing a comparison between a measurement result of the maximum turn to turn voltage of each coil provided on the inverter system according to Embodiment 1 of the present invention and that on the inverter system in which over-voltage reduction measure is not taken.

Measurement result of the maximum turn to turn voltage of each coil provided on the motor that is represented in the circuit configuration of FIG. 1(a) and FIG. 1(b) is represented in FIG. 5. The measurement was carried out under conditions similar to those in FIG. 3, where the rotating machine 3 has a delta connection as illustrated in FIG. 4, and each phase includes four coils. The measurement were carried out to measure the voltages between the neighboring terminals (between the start and the end of each coil winding) among the terminals (U-phase: Um, U12, U34, H56; V-phase: Vm, V12, V34, V56; W-phase: Wm, W12, W34, W56) represented in FIG. 4.

As seen from FIG. 5, in the circuit configuration of FIG. 1(b), the maximum values of the V-phase first-coil turn to turn voltages Vm-V12 and Vm-W56 are 20% or more higher comparing to those of the U-phase first-coil turn to turn voltages Um-U12 and Um-U56, and the W-phase first-coil turn to turn voltages Wm-W12 and Wm-W56; however, in the circuit configuration of FIG. 1(a), the V-phase first-coil turn to turn voltage is controlled at the same value as the U-phase and the W-phase first-coil turn to turn voltage. By connecting a capacitor, having predetermined capacitance, between any specified phase of the electric-power supplying terminals of the rotating machine and the ground terminal, a phenomenon in which the first-coil turn to turn voltage of the specified phase becomes higher than that of other 2 phases can be prevented; consequently, the difference of the over voltage among the three phases can be eliminated, and surge voltage generating only in the specified phase out of the three phases can also be prevented. As a result, the maximum over voltage can be reduced over the entire system.

Figure 6:
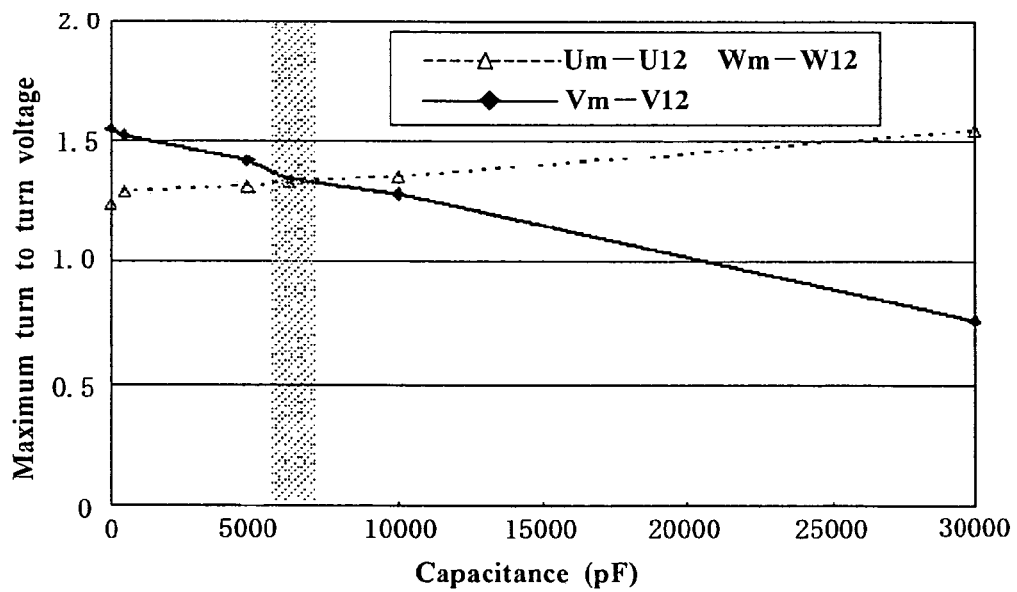
FIG. 6 is a graph representing a measurement result of the maximum turn to turn voltage of a first coil provided on the rotating machine, when the capacitance of an over-voltage reducing capacitor is varied.

A result is represented in FIG. 6, in which the maximum turn to turn voltage of the first coil provided on the rotating machine 3 has been measured, when a 100 m four-core vinyl-cabtire cable having 2 mm² core-line cross-sectional area is connected, and the capacitance of the over-voltage reducing capacitor 4 is varied. As represented in FIG. 6, when the capacitance of the over-voltage reducing capacitor 4 connected between a certain phase of the terminals provided on the rotating machine and ground increases, the first-coil turn to turn voltage of the phase connected to the over-voltage reducing capacitor 4 decreases, meanwhile the first-coil turn to turn voltage of the phase to which the over-voltage reducing capacitor 4 is not connected increases. The capacitance of the over-voltage reducing capacitor, by which the first-coil turn to turn voltage of the phase to which the over-voltage reducing capacitor is connected and that of the phase to which the capacitor is not connected are made approximately equal to each other, is approximately 6000 pF, when the 100 m four-core vinyl-cabtire cable having the 2 mm² core-line cross-sectional area is connected. This value approximately agrees with the value in which the capacitance between Wc-Gc is subtracted from that between Rc-Gc and Bc-Gc in the power supplying cable 2 of FIG. 1(a). At this time, severity on the insulation structure of the rotating machine 3 is reduced most. That is, by connecting the over-voltage reducing capacitor 4 between the electric-power supplying terminal and the ground terminal of the rotating machine so that line-to-ground capacitance of each phase in the power supplying cable 2 becomes approximately equal to each other, the phenomenon in which the first-coil turn to turn voltage of the specified phase becomes higher than that of other 2 phases can be prevented; consequently, the maximum over voltage can be reduced in the entire system. As a result, even though relatively low surge voltages at similar level has generated in the three phases, as long as enough insulation is assured, a capacitor may only be provided at one single point thereof, therefore, a high-reliability system can be obtained with a low-cost system configuration.

Specifically, a capacitor whose capacitance is equivalent to the difference value in which the lowest value among the capacitances between each phase power supplying lines and the ground line is subtracted from the highest value among the capacitances may be connected between the ground terminal and a rotating-machine power supplying terminal at which line-to-ground capacitance of a power supplying line in the power supplying cable is the lowest among three phases comparing to those of the other lines in the cable. However, in order to connect a capacitor whose capacitance is equal to that in which the lowest value among the capacitances between each phase the power supplying lines and the ground line is subtracted from the highest value among the capacitances between each phase and ground, capacitances need to be measured precisely. Conveniently, if a capacitor having 80-150% of capacitance that is equivalent to the subtracted value, preferably a capacitor having capacitance indicated in the shaded region (90-120% of the subtracted value) in FIG. 6, is connected between them, each capacitance of the phases is balanced; consequently, the phenomenon in which the turn to turn voltage of the specified phase becomes higher than that of other 2 phases can be prevented.

Here, when the capacitor is inserted based on the system described above, not only the first-coil turn to turn voltage of a specified phase but also the line-to-ground voltage at an electric-power supplying terminal, according to a specified phase, of the rotating machine can also be prevented.

Figure 1:
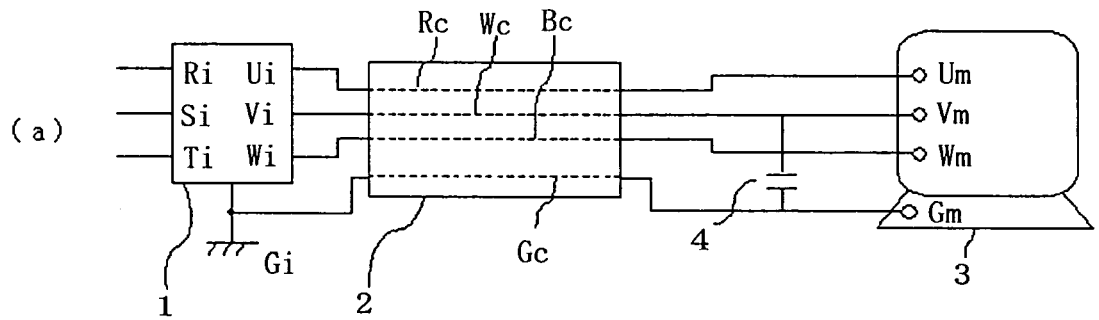
FIG. 1 is circuit-configuration views illustrating an inverter system according to Embodiment 1 of the present invention, and an inverter system in which over-voltage reduction measure is not taken.

Moreover, the over-voltage reducing capacitor 4 is connected between Vm and Gm in the inverter system of FIG. 1(*a*), because the line-to-ground capacitance of the cable power-supplying line Wc connected to Vm is lower comparing to those of the other phases; therefore, when the line-to-ground capacitance of the cable power-supplying line connected to Um is lower comparing to those of the other phases, the preventing capacitor 4 having capacitance determined similarly to the above described manner may be connected between Um and Gm. Similarly, when the line-to-ground capacitance of the cable power-supplying line connected to Wm is lower than those of the other phases, the over-voltage reducing capacitor 4 having capacitance determined similarly to the above described manner may be connected between Wm and Gm.

Figure 7:
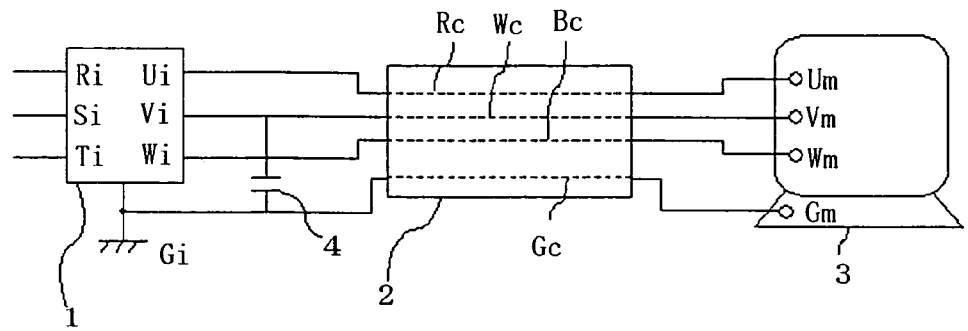
FIG. 7 is a circuit-configuration view illustrating another inverter system according to Embodiment 1 of the present invention.

Furthermore, in the inverter system of FIG. 1(*a*), although the over-voltage reducing capacitor 4 is connected between the electric-power supplying terminal Vm and the ground terminal Gm of the rotating machine, even when the over-voltage reducing capacitor 4 is inserted between an output terminal Vi and the ground terminal Gi of the electric power converter (inverter) as represented in FIG. 7, similar effect of preventing excessive surge voltage at specified phase can be obtained.

Here, the over-voltage reducing capacitor 4 is connected between Vi and Gi in the inverter system of FIG. 7, because the line-to-ground capacitance of the cable power-supplying line Wc connected to Vi is lower comparing to those of the other phases; therefore, similar to the above embodiment, when the line-to-ground capacitance of the cable power-supplying line connected to Ui is lower comparing to those of the other phases, and when the line-to-ground capacitance of the cable power-supplying line connected to Wi is lower comparing to those of the other phases, the preventing capacitor 4 having capacitance determined similarly to the above described manner may be connected between Ui and Gi, and between Wi and Gi, respectively.

Moreover, a case in which the over-voltage reducing capacitor 4 is connected between the electric-power supplying terminal Vm and the ground terminal Gm of the rotating machine in the inverter system of FIG. 1(*a*), and a case in which the over-voltage reducing capacitor 4 is connected between the output terminal Vi and the ground terminal Gi of the electric power converter (inverter) in the inverter system of FIG. 7 have been represented; however, the over-voltage reducing capacitor 4 may be connected to the side of the cable power-supplying lines.

For example, in a part of the cable power-supplying line (an uncovered part of the line), even when the over-voltage reducing capacitor 4 is connected between the cable power-supplying line, in which the line-to-ground capacitance is lower comparing to those of the other phases and the ground line, similar effect of preventing excessive surge voltage at specified phase can be obtained.

Figure 8:
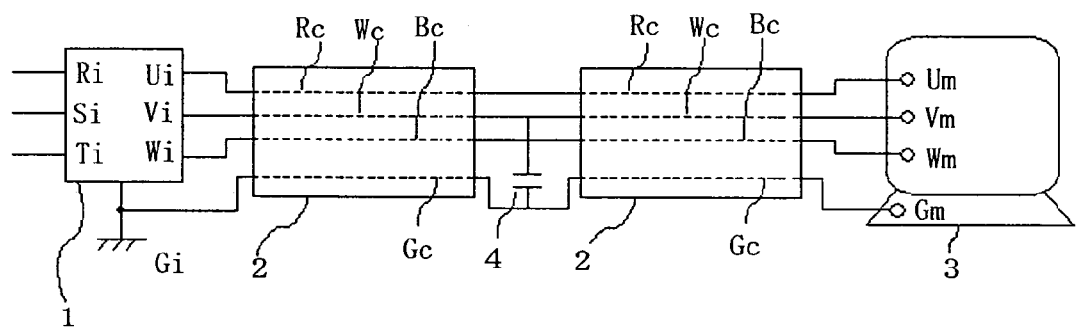
FIG. 8 is a circuit-configuration view illustrating still another inverter system according to Embodiment 1 of the present invention.

Moreover, as illustrated in FIG. 8, even when two cables are connected in series, and in the intermediate connecting portion, the over-voltage reducing capacitor 4 is connected between the cable power-supplying line, in which the line-to-ground capacitance is lower comparing to those of the other phases, and the ground line, similar effect of preventing excessive surge voltage can be obtained. In such a case, even if the lengths of the two cables connected in series are either the same or different from each other, similar effect can be obtained.

Here, the over-voltage reducing capacitor 4 is connected between Wc and Gc in the inverter system of FIG. 8, because the line-to-ground capacitance of the cable power-supplying line Wc is lower comparing to those of the other phases; therefore, similar to the above embodiment, when the line-to-ground capacitance of the cable power-supplying line Rc is lower comparing to those of the other phases, and when the line-to-ground capacitance of the cable power-supplying line connected to Bc is lower comparing to those of the other phases, the over-voltage preventing capacitor 4 having capacitance determined similarly to the above described manner may be connected between Rc and Gc, and between Bc and Gc, respectively.

Moreover, a four-core cabtire cable is used as the cable 2 connecting the inverter 1 with the motor 3 in the above embodiment; however, this method is not limited to the four-core cabtire cable, but effective also for any non-coaxial cable in which the capacitance between the power supplying lines and the ground line in the cable is unbalanced. Furthermore, this method is not limited to the four cores, but can be also applied to a non-coaxial cable including, for example, more than four core lines connected to the ground line and the three-phase power-supplying lines.

Embodiment 2

Figure 9:
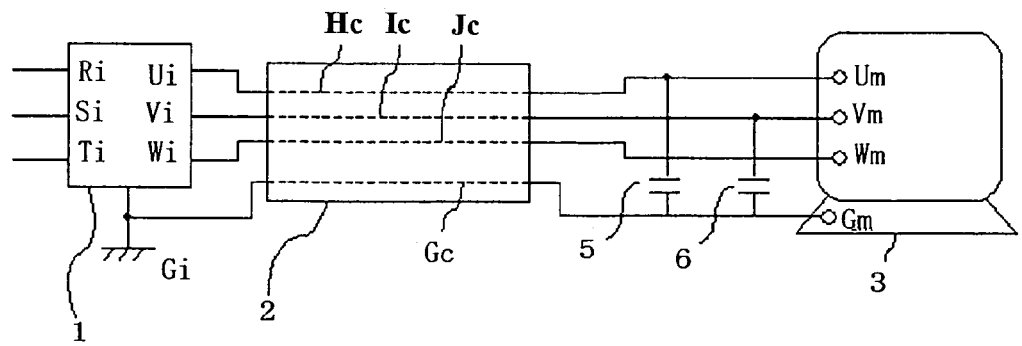
FIG. 9 is a circuit-configuration view illustrating an inverter system according to Embodiment 2 of the present invention.
Figure 10:
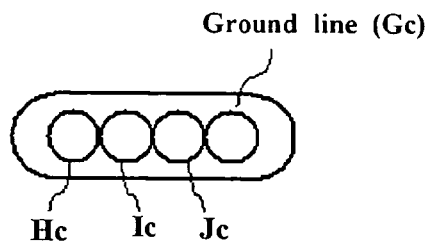
FIG. 10 is a cross-sectional configuration view illustrating a four-core flat cable according to Embodiment 2 of the present invention.

FIG. 9 is a circuit-configuration view illustrating an inverter system according to Embodiment 2 of the present invention. For example, a case will be explained, in which a four-core flat cable having a cross-section as represented in FIG. 10 is used as the power supplying cable 2 connecting the inverter 1 with the rotating machine 3 represented in FIG. 9. As represented in FIG. 10, in a case in which a line disposed outmost in the 4 core lines forming the four-core flat cable is used as the ground line (Gc), while the remaining three power-supplying lines as Jc, Ic, and Hc in order from Gc in the 4 core lines, Jc has the maximum line-to-ground capacitance value among capacitances, Ic has the value next to Jc, and Hc has the minimum value.

In the inverter system represented in FIG. 9, each phase output terminal of the inverter 1, each power-supplying line of the cable 2, and each phase power-supplying terminal of the rotating machine 3 are connected as Ui-Hc-Um, Vi-Ic-Vm, and Wi-Jc-Wm. In this case, capacitors 5 and 6 are connected between the rotating-machine power-supplying terminal of the U phase in which the line-to-ground capacitance becomes the lowest value in the flat cable and the ground terminal of the rotating machine, and between the rotating-machine power-supplying terminal of the V phase in which the capacitance becomes next to the lowest value and the rotating-machine ground terminal, respectively. Each capacitance of these capacitors 5 and 6 is set equal to a value in which the line-to-ground capacitance of Hc is subtracted from the line-to-ground capacitance of Jc, and equal to a value in which the line-to-ground capacitance of Ic is subtracted from the line-to-ground capacitance of Jc, respectively; or conveniently set in a range of 80%-150% (preferably, 90-120% of the subtracted value) of the value in which the line-to-ground capacitance of Hc is subtracted from the line-to-ground capacitance of Jc, or the value in which the line-to-ground capacitance of Ic is subtracted from the line-to-ground capacitance of Jc, respectively.

By connecting such capacitors 5 and 6 with the rotating-machine terminals, excessive turn to turn voltage generation in a specified phase can be prevented, and surge voltage can be reduced over the entire system.

In the above embodiment, a power supplying line in which the line-to-ground capacitance in the cable portion becomes the lowest value is used for the U phase, and a power supplying line in which the line-to-ground capacitance becomes next to the lowest value is used for the V phase; however, whichever phase terminals each power supplying line is connected to, by connecting capacitors, each having a predetermined capacitance, between electric-power supplying terminals of the rotating-machine in which the line-to-ground capacitance becomes the lowest value and next to the lowest value, and the ground terminal of the rotating machine, a similar effect can be obtained.

In the above embodiment, the over-voltage reducing capacitors 5 and 6 are connected between the phase in which the line-to-ground capacitance becomes the lowest value and the ground terminal, and between the phase in which the capacitance becomes next to the lowest value and the ground terminal, respectively; however, even if the over-voltage reducing capacitors 5 and 6 are connected between the phase in which the line-to-ground capacitance becomes the lowest value and the ground terminal, and between the phase in which the capacitance becomes next to the lowest value and the ground terminal, respectively, of the output terminals on the electric power converter (inverter), similar effect of preventing excessive surge voltage can also be obtained.

Similarly, in an end portion or an intermediate portion of the cable power-supplying line in the inverter system, even if the over-voltage reducing capacitors 5 and 6 are inserted between the phase in which the line-to-ground capacitance becomes the lowest value and the ground terminal, and between the phase in which the capacitance becomes next to the lowest value and the ground terminal, respectively, similar effect of preventing excessive surge voltage can also be obtained.

Moreover, in the above embodiment, a four-core flat cable is used for the cable 2 for connecting the inverter 1 with the motor 3, which is effective when a non-coaxial cable in which the ground line and the three-phase power-supplying lines are composed of different core lines is used; this method is effective not only to the four-core flat-type cable, but also to any non-coaxial cable in which the capacitance is unbalanced between the power supplying lines and the ground line in the cable. Furthermore, this method is not limited to the four cores, but can be also applied to the cable that has more than four core lines.

Embodiment 3

In Embodiments 1 and 2, the over-voltage reducing capacitors 4, 5, and 6 are externally connected between the electric-power supplying terminals of the rotating machine and the ground terminal, between the output terminals of the electric power converter (inverter) and the ground terminal, or between the power-supplying lines and the ground line; however, variable capacitors may be pre-installed on the power-supplying terminal board of the rotating machine or on the inverter, so as to enable over-voltage to be reduced by easily controlling the capacitance of the capacitors in accordance with arbitrary cable length. In this case, if a four-core cabtire cable is known to be used in advance as the cable, the variable capacitor is desirably configured so as to be connected between Vm of the rotating machine and the ground terminal; however, when a cable such as a four-core flat cable in which the line-to-ground capacitance of each phase is different from each other is expected to be used other than a four-core cabtire cable, the variable capacitors may be provided between each of any two phase electric-power-supplying terminals of the rotating machine and the ground terminal, or between each of any two phase output terminals and the ground terminal, so as to enable over-voltage to be reduced, when such a cable is also used. In this case, when the cable is connected, power supplying lines of the phases in which the line-to-ground voltage is the lowest and next to the lowest are preferably connected to the electric-power supplying terminals of the motor or the output terminals of the inverter provided with the variable capacitors.

Moreover, the variable capacitors may be connected between each of the rotating-machine power-supplying terminals of all three phases and the ground terminal, or between each of the inverter output terminals of all three phases and the ground terminal. When a cable, in which the line-to-ground capacitance of only one of the phases is relatively lower, in such a case as a four-core cabtire cable is used, the capacitance of a variable capacitor connected to each two phase in which the line-to-ground capacitance is not the lowest among three lines may be set at 0 pF, or at a low value, for example, not higher than several dozen pF, which is lower than the line-to-ground capacitance, while the capacitance of variable capacitors connected to a phase in which the line-to-ground capacitance is the lowest among three lines may be set in such a way that the capacitance between each of the power supplying lines for all three phases and the ground line becomes the same value.

Moreover, when a cable such as a four-core flat cable in which the line-to-ground capacitances for the phases is all different from each other is used, the capacitance of the variable capacitor connected to a phase in which the line-to-ground capacitance is the highest may be set at 0 pF, or at a lower value such as not higher than several dozen pF, which is lower comparing to the line-to-ground capacitance, while the capacitance of the variable capacitors connected to phases in which the line-to-ground capacitance is the lowest and next to the lowest may be set in such a way that the capacitances between each of the power supplying lines for all three phases and the ground line become the same value.

The capacitive variable range of a variable capacitor differs in accordance with cable length expected to be connected to the inverter system. The variable range is desirably determined in such a way that the lower limit can be set at not higher than several dozen pF, while the upper limit at not lower than L×ΔC (ΔC: the difference in per-meter line-to-ground capacitances of the three-phase power-supplying lines) in the electric-power converting system in which a cable of L m as its maximum length is expected to be used. Specifically, the upper limit of the variable range is desirably determined to be not lower than 10000 pF in the electric-power converting system in which a cable of 100 m as its maximum length is expected to be used, because of typical ΔC being less than 100 pF.

Embodiment 4

Figure 11:
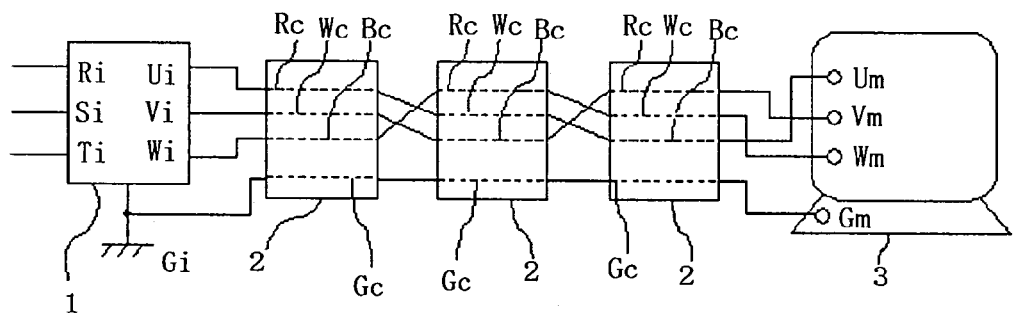
FIG. 11 is a circuit-configuration view illustrating an inverter system according to Embodiment 4 of the present invention.

FIG. 11 is a circuit-configuration view illustrating an inverter system according to Embodiment 4 of the present invention. In FIG. 11, the three-phase output terminals Ui, Vi, and Wi provided on the PWM inverter 1 are connected to each of the phase terminals provided on the ac rotating machine 3 using three cables 2 with the same length, each including the ground line Gc. These cables have a cross-sectional structure as illustrated in FIG. 2, for example, when a four-core cabtire cable is used. Here, as illustrated in FIG. 11, the power supplying lines included in the three cables with the same length are twistedly connected in such a way that each of all three-phase power-supplying lines uses one of Wc's (the lowest line-to-ground-capacitance line among the power supplying lines included in each cable) of the three cables, that is, the three-phase power-supplying lines are connected, for example, as Ui-Rc-Wc-Bc-Um, Vi-Wc-Bc-Rc-Vm, and Wi-Bc-Rc-Wc-Wm. By connecting such as that, the line-to-ground capacitance of each phase of the power supplying lines connecting the inverter with the rotating machine becomes equal to each other; consequently, similar to Embodiment 1, the phenomenon in which the turn to turn voltage of the first coil provided on any specified phase becomes higher than that of other 2 phases can be prevented, and the maximum over voltage can be reduced over the entire system.

Embodiment 5

Figure 12:
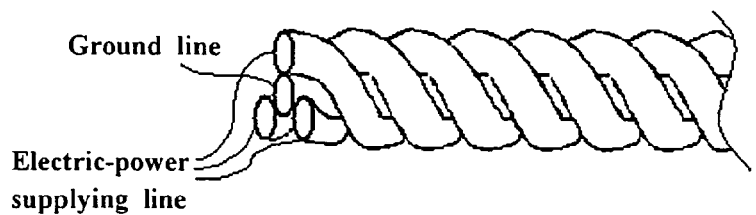
FIG. 12 is a perspective view illustrating a cable according to Embodiment 5 of the present invention.
Figure 13:
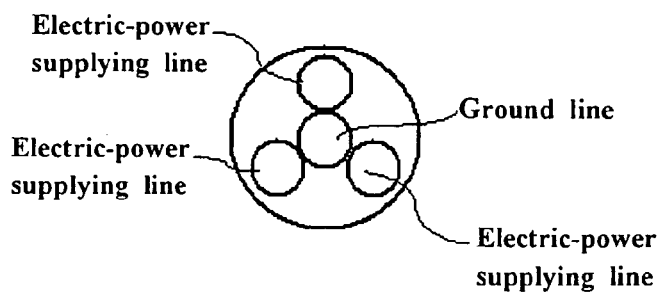
FIG. 13 is a configurational view illustrating a cross-section of the cable according to Embodiment 5 of the present invention.

FIG. 12 is a perspective view illustrating a cable used as power supplying lines of an inverter system according to Embodiment 5 of the present invention. A cable illustrated in FIG. 12 is a four-core cable being structured such that three power-supplying lines have been wound around a ground line. In such a structure as described above, the cross-section at an arbitrary part of the cable is shaped as illustrated in FIG. 13, and the capacitance between each of the three-phase supplying lines and the ground line become equal to each other. By applying such structured cable to the power supplying lines of the inverter system, each line-to-ground capacitance of the phases of the power supplying lines connecting the inverter with the rotating machine becomes equal to each other; consequently, similar to Embodiment 1, the phenomenon in which the turn to turn voltage of the first coil provided on any specified phase becomes higher than that of other 2 phases can be prevented, and the maximum over-voltage can be reduced over the entire system.

What is claimed is:

1. An inverter system comprising:
an electric power converter;
a three-phase AC rotating machine;
a non-coaxial cable having not fewer than four electrically conducting cores, including a ground line and three phase lines, connecting the electric power converter to the three-phase AC rotating machine; and
no more than two capacitors connected between respective power supplying terminals of the three-phase AC rotating machine, and a ground terminal of the AC rotating machine, so that respective capacitances between the three phase lines and the ground line become approximately equal to each other.

2. An inverter system comprising:
an electric power converter;
a three-phase AC rotating machine;
a non-coaxial cable having not fewer than four electrically conducting cores, including a ground line and three phase lines, connecting the electric power converter to the three-phase AC rotating machine; and
no more than two capacitors connected between respective output terminals of the electric power converter, and a ground terminal of the electric power converter, so that respective capacitances between the three phase lines and the ground line become approximately equal to each other.

3. An inverter system comprising:
an electric power converter;
a three-phase AC rotating machine;
a non-coaxial cable having not fewer than four electrically conducting cores, including a ground line and three phase lines, connecting the electric power converter to the three-phase AC rotating machine; and
no more than two capacitors connected between the ground line and respective three phase lines so that respective capacitances between the three phase lines and the ground line become approximately equal to each other.

4. The inverter system as recited in claim 1, wherein:
the no more than two capacitors are connected to respective three phase lines having respective line-to-ground capacitances in the cable lower than that of the other lines or line, respectively; and
each capacitor has a capacitance equivalent to the difference between the capacitance of the cable for a phase having largest line-to-ground capacitance and each capacitance of the cable for the other two phases.

5. The inverter system as recited in claim 2, wherein:
the no more than two capacitors are connected to respective three phase lines having respective line-to-ground capacitances in the cable lower than that of the other lines or line, respectively; and
each capacitor has a capacitance equivalent to the difference between the capacitance of the cable for a phase having largest line-to-ground capacitance and each capacitance of the cable for the other two phases.

6. The inverter system as recited in claim 1, wherein:
the no more than two capacitors are connected to respective three phase lines having respective line-to-ground capacitance in the cable lower than that of the other lines or line, respectively; and
each capacitor has a capacitance that is 80 to 150% of the difference between the capacitance of the cable for a phase having largest line-to-ground capacitance and each capacitance of the cable for the other two phases.

7. The inverter system as recited in claim 2, wherein:
the no more than two capacitors are connected to respective three phase lines having respective line-to-ground capacitance in the cable lower than that of the other lines or line, respectively; and
each capacitor has a capacitance that is 80 to 150% of the difference between the capacitance of the cable for a phase having largest line-to-ground capacitance and each capacitance of the cable for the other two phases.

8. An inverter system comprising:
an electric power converter;
a three-phase AC rotating machine; and
three same-length non-coaxial cables, each non-coaxial cable having not fewer than four electrically conducting cores, including a ground line and three phase lines, one of the phase lines of each of the three same-length non-coaxial cables having a lower line-to-ground capacitance than the other phase lines of the respective same-length non-coaxial cable, wherein
the three same-length non-coaxial cables are serially connected and connect the electric power converter to the three-phase AC rotating machine,
the electrically conducting cores of each of the three same-length non-coaxial cables are twisted with respect to each, and
each conducting path between the electric power converter and three-phase AC rotating machine through the three same-length non-coaxial cables includes only one of the phase lines having lower capacitance than the other phase lines of the respective same-length non-coaxial cables and respective capacitances between the three phase lines and the ground line are substantially equal to each other.

9. An AC rotating machine comprising three phase terminals, a ground terminal, and a variable capacitor connected between no more than two of the three phase terminals and the ground terminal of the machine.

10. An electric power converter comprising three phase output terminals, a ground terminal, and a variable capacitor connected between no more than two of the three output terminals and the ground terminal of the converter.

* * * * *